(12) United States Patent
Hermey et al.

(10) Patent No.: US 9,435,398 B2
(45) Date of Patent: Sep. 6, 2016

(54) ENERGY GUIDING DEVICE

(71) Applicant: igus GmbH, Cologne (DE)

(72) Inventors: Andreas Hermey, Hennef (DE); Dominik Barten, Meckenheim (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 14/785,100

(22) PCT Filed: Apr. 14, 2014

(86) PCT No.: PCT/EP2014/057529
§ 371 (c)(1),
(2) Date: Oct. 16, 2015

(87) PCT Pub. No.: WO2014/170272
PCT Pub. Date: Oct. 23, 2014

(65) Prior Publication Data
US 2016/0069422 A1    Mar. 10, 2016

(30) Foreign Application Priority Data
Apr. 16, 2013  (DE) .................... 20 2013 101 604 U

(51) Int. Cl.
*F16G 13/16*    (2006.01)
*H02G 3/04*    (2006.01)
(Continued)

(52) U.S. Cl.
CPC ............... *F16G 13/16* (2013.01); *H02G 3/04* (2013.01); *H02G 3/0475* (2013.01); *H02G 9/12* (2013.01); *H02G 11/00* (2013.01)

(58) Field of Classification Search
CPC .................................. F16G 13/16; H02G 3/04
See application file for complete search history.

(56) References Cited

U.S. PATENT DOCUMENTS

| 5,254,809 A | 10/1993 | Martin |
| 6,161,373 A * | 12/2000 | Heidrich ................. F16G 13/16 248/49 |

(Continued)

FOREIGN PATENT DOCUMENTS

| DE | 4119211 C1 | 12/1992 |
| DE | 102007017940 A1 | 10/2008 |

(Continued)

OTHER PUBLICATIONS

English language PCT International Search Report mailed Sep. 25, 2014, received in corresponding PCT Application No. PCT/EP14/57529, 3 pgs.

(Continued)

*Primary Examiner* — David B Jones
(74) *Attorney, Agent, or Firm* — Grossman Tucker Perreault & Pfleger, PLLC

(57) ABSTRACT

The invention relates to an energy guiding device for supply lines, such as cables, hoses and other lines, particularly for supplying machines in the offshore sector that are used under water, e.g. for supplying drill heads that essentially drill vertically downwards. The essential new features consist in that the energy guiding device is designed as an energy guiding chain (1; 15), in that the energy guiding chain (1; 15) displays at least two parallel load strands (3; 16) with consecutively arranged straps (4; 17), in that the straps (4; 17) are made of flexible, water-resistant material and permanently connected to the adjacent straps via coupling elements (5; 18) to form a load strand (3; 16), in that at least one tension-resistant, water-resistant cable (6; 20), extending over the entire length of the energy guiding chain (1; 15), is guided through each load strand (3; 16), in that the load strands (3; 16) formed from the straps (4; 17) are connected to each other by cross-members (7; 19) arranged at intervals, and in that the cross-members (7; 19) display holders (8) for receiving the supply lines (2).

28 Claims, 4 Drawing Sheets

Figure 3:
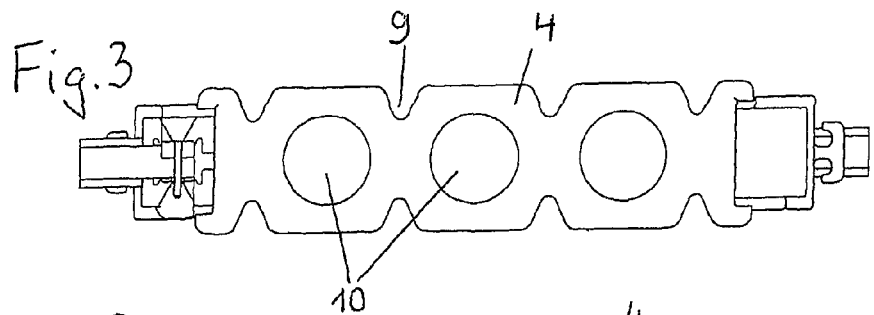

(51) Int. Cl.
*H02G 9/12* (2006.01)
*H02G 11/00* (2006.01)

(56) References Cited

U.S. PATENT DOCUMENTS

| | | | |
|---|---|---|---|
| 6,708,480 B1 * | 3/2004 | Wehler | F16G 13/16 248/49 |
| 6,789,383 B1 | 9/2004 | Plush et al. | |
| 7,845,155 B2 * | 12/2010 | Jaeker | F16G 13/16 248/49 |
| 8,733,077 B2 * | 5/2014 | Garcia | F16G 13/16 248/49 |
| 2001/0007286 A1 * | 7/2001 | Richter | F16G 13/16 174/138 G |
| 2003/0000198 A1 * | 1/2003 | Hermey | H02G 11/006 59/78.1 |
| 2012/0312933 A1 | 12/2012 | Casadei | |
| 2013/0020290 A1 | 1/2013 | Epperlein | |
| 2013/0087646 A1 | 4/2013 | Trevisani | |
| 2015/0121834 A1 * | 5/2015 | Kim | H02G 11/006 59/78.1 |

FOREIGN PATENT DOCUMENTS

| | | |
|---|---|---|
| DE | 102009030857 A1 | 5/2011 |
| DE | 102010007580 A1 | 8/2011 |
| DE | 202012010236 U1 | 11/2012 |
| EP | 0810151 A2 | 12/1997 |
| EP | 2096729 A1 | 9/2009 |

OTHER PUBLICATIONS

English language PCT International Preliminary Report on Patentability and Written Opinion issued Oct. 20, 2015, received in corresponding PCT Application No. PCT/EP14/57529, 9 pgs.

* cited by examiner

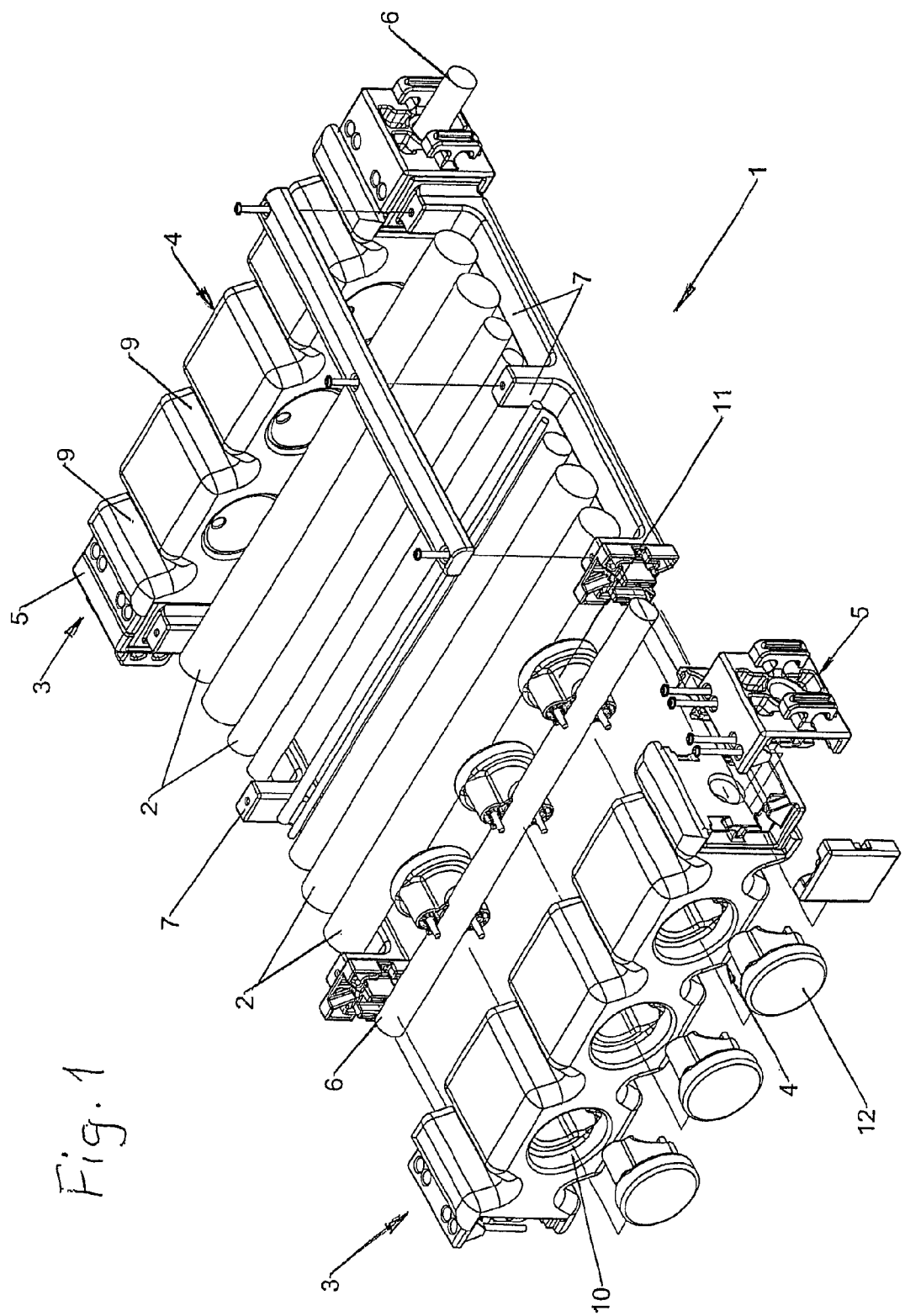

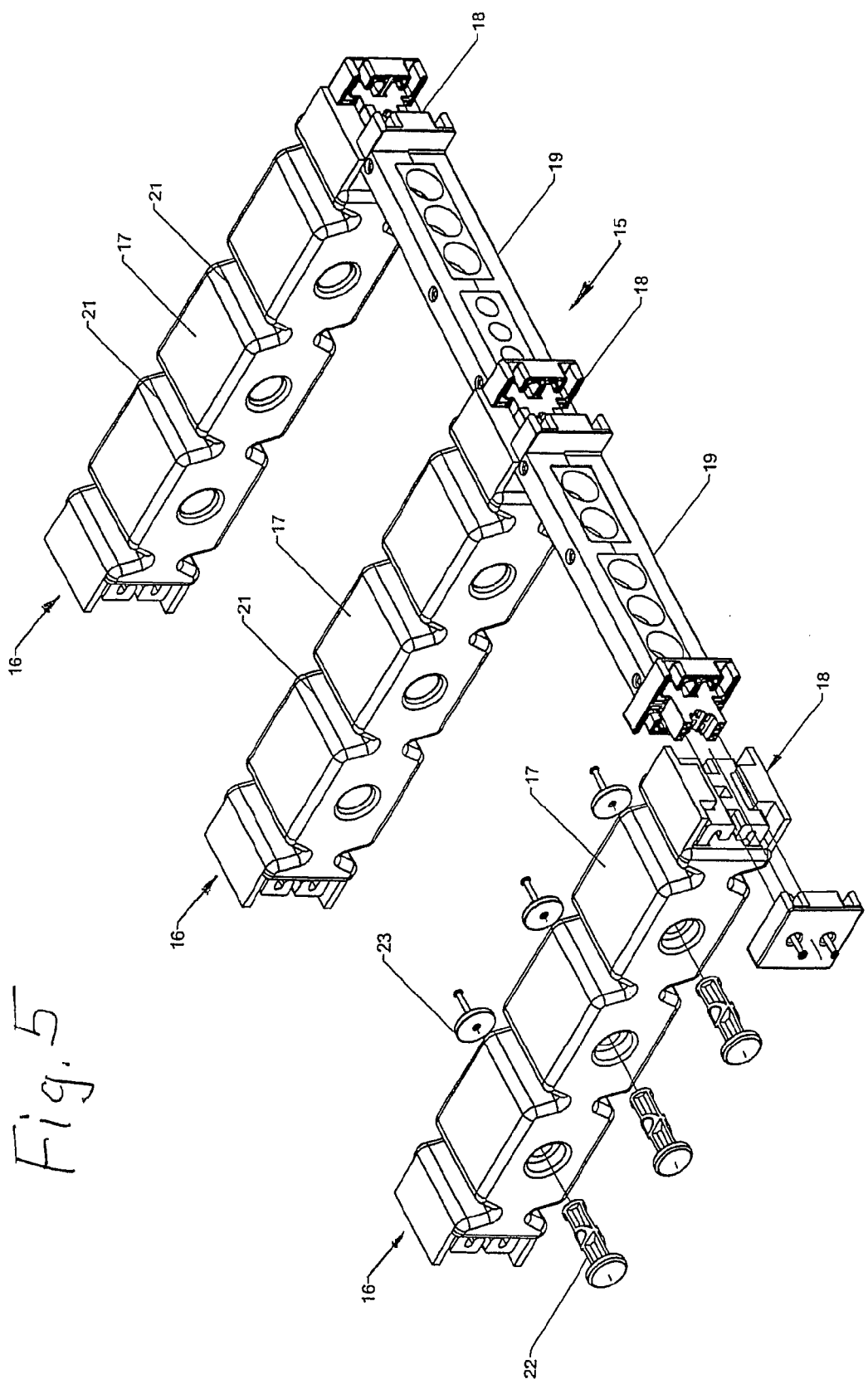

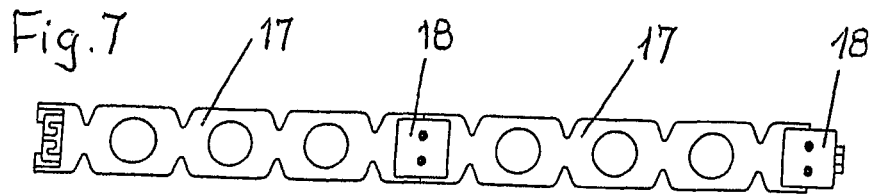
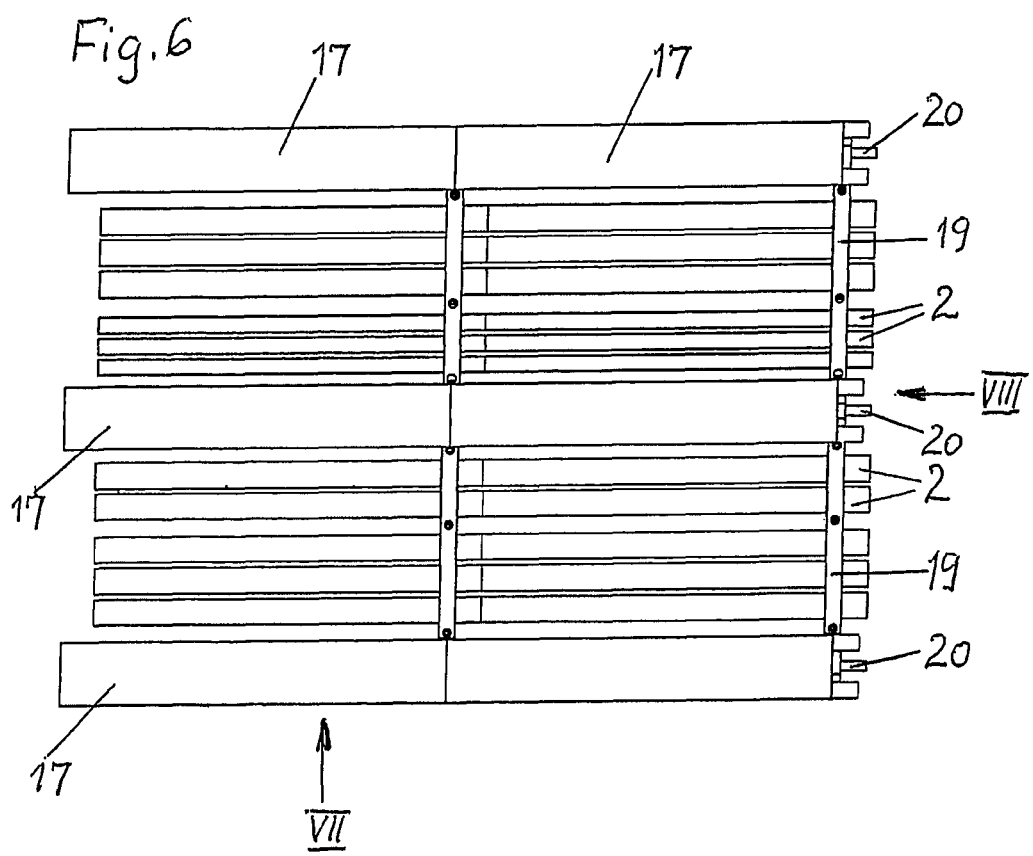
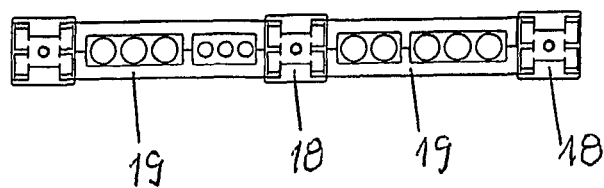

ENERGY GUIDING DEVICE

The invention relates to an energy guiding device for supply lines, such as cables, hoses and other lines, particularly for supplying machines in the offshore sector that are used under water, e.g. for supplying drill heads that essentially drill vertically downwards.

Drilling of this kind is performed to create foundations for offshore wind turbines, for example. To supply drill heads of this kind, which operate at depths of up to roughly 200 m, permanently encased cable bundles have so far been used, being guided down to the seabed from a ship or a working platform. This known art has the disadvantage that, when using the encased cable bundles, no individual lines can be exchanged or added in order to replace them for other lines in the event of a defect or damage, or to expand them by additional lines. Moreover, the load-bearing capacity of the lines also causes problems in the event of very deep drilling, since there is a risk of the tensile stresses acting on the lines exceeding the permissible limits.

The object of the invention is therefore to create an energy guiding device for the offshore sector that eliminates the problems existing to date.

According to the invention, the object is solved in that the energy guiding device is designed as an energy guiding chain, in that the energy guiding chain displays at least two load strands with consecutively arranged straps, in that the straps are made of flexible, water-resistant material and permanently connected to the adjacent straps via coupling elements to form a load strand, in that at least one tension-resistant, water-resistant cable, extending over the entire length of the energy guiding chain, is guided through each load strand, in that the load strands formed from the straps are connected to each other by cross-members arranged at intervals, and in that the cross-members display holders for receiving the supply lines.

Owing to the design according to the invention, the supply lines, mounted in the holders of the cross-members of the load strands, can be exchanged at will, such that defective lines can be replaced and/or additional lines or lines having different properties can be installed, if necessary. Similarly, extremely great lengths no longer cause any difficulties, since the load is essentially absorbed by the cables passing through the load strands, such that the supply lines are not excessively stressed.

For this purpose, at least some of the holders provided on the cross-members are preferably provided with a strain relief for the supply lines, such that the tensile stress is absorbed almost exclusively by the cables extending through the load strands.

The flexible material of which the straps are made is expediently impact-resistant, compression-proof and shock-absorbing, such that the supply lines are sufficiently protected even during operation in rough seas.

In a preferred embodiment of the invention, the material of which the straps are made has a specific gravity lighter than that of water. A measure of this kind gives the overall energy chain a certain buoyancy, meaning that it is easier to handle and that only little force has to be applied to haul in the energy guiding chain.

The material of which the straps are made can be a closed-cell foam.

Alternatively, the material of which the straps are made can be an at least partially open-cell foam, in which case, however, the straps consisting of this material must then be coated with a waterproof, protective layer in order to prevent the ingress of water into the foam.

The straps are preferably of oblong design—e.g. in the region of 20 to 150 cm—and provided with at least one constriction over their length, in order to ensure sufficient flexibility.

The straps expediently display an essentially rectangular cross-section, where the constrictions are designed as grooves, provided on at least one side of the straps and arranged parallel to the cross-members connecting the load strands to each other. This measure defines a principal plane, in which the straps can be bent. The grooves are expediently provided on opposite sides of the straps, in order to ensure good flexibility in both directions of the principal plane.

The coupling elements connecting the straps to each other are preferably made of a stable, rigid material, since the flexibility of the energy guiding chain is provided exclusively through the flexibility of the straps.

In this context, the cross-members serving to hold the supply lines are expediently located between the rigid coupling elements, such that the supply lines can be accommodated stably and reliably.

In a preferred embodiment of the invention, the cable extending through the load strands is made of seawater-resistant plastic or stainless steel wire, meaning not only that sufficiently high tensile loads can be absorbed, but also that long-term use is guaranteed.

The cable preferably lies in the neutral axis of the load strands and is fixed in this position, such that the energy guiding chain can bend freely to both sides, at least in one principal plane.

This advantageous property ensures that the energy guiding chain can be wound up onto a rotating drum, installed on board a ship or a working platform.

Alternatively, since it can be bent to both sides, the energy guiding chain can also be hung on a suspension device, located on board a ship or on a working platform, in the form of a series of loops formed one behind the other.

The space-saving storage of the energy guiding chain is particularly important because there is usually a pronounced shortage of space on ships and working platforms.

The energy guiding device according to the invention is not restricted solely to use in the offshore sector. The energy guiding chain displaying the features according to the invention can be used wherever the energy guiding chain is predominantly subjected to tensile stress. The energy guiding chain displaying the features according to the invention is also suitable for any kind of operation involving rough and dirty conditions. The invention creates a robust system, in which the lines are protected against external harmful effects, particularly those of impacts and exposure to dirt. Beyond this, the system according to the invention is easy to clean, since there are no parts moving relative to each other, such as joints. The system according to the invention can therefore also be advantageously used in mining, open-cast mining, tunnel construction, bulk material handling and the like.

Figure 2:
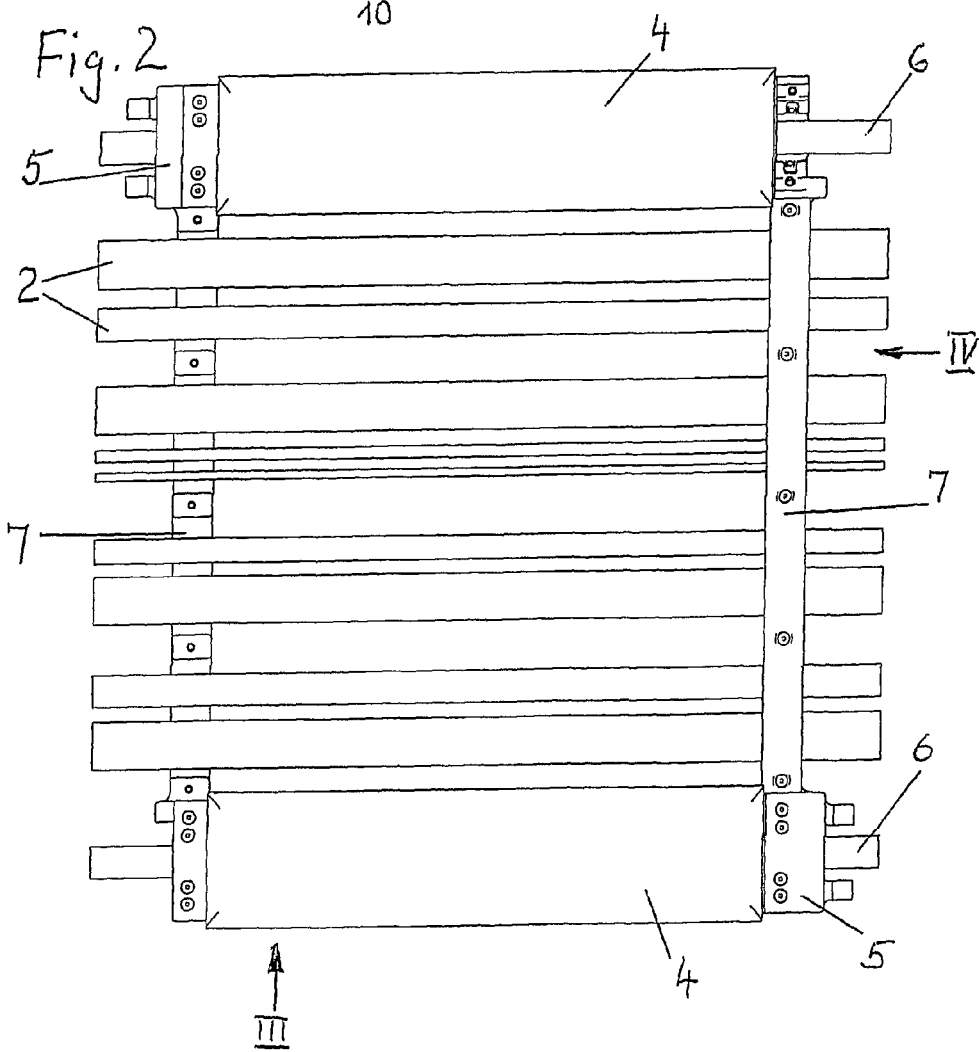

The invention is illustrated in exemplary form in the drawing and described in detail below on the basis of the drawing. The Figures show the following:

FIG. 1: An exploded perspective view of a section of a first embodiment of an energy guiding device with two load strands, FIG. 2: A top view of the arrangement according to FIG. 1, FIG. 3: A side view in the direction of arrow III in FIG. 2, FIG. 4: A view in the direction of arrow IV in FIG. 2, FIG. 5: An exploded perspective view of a section of a second embodiment of an energy guiding device with three load strands, FIG. 6: A top view of the energy guiding device according to FIG. 5, FIG. 7: A side view in the direction of arrow VII in FIG. 6, and FIG. 8: A view in the direction of arrow VIII in FIG. 6.

According to FIGS. 1 to 4 of the drawing, the energy guiding device according to the invention is designed as an energy guiding chain 1, which serves to accommodate different supply lines 2, such as cables, hoses and other lines. The energy guiding chain 1 shown in the drawing is envisaged for supplying drill heads used under water in the offshore sector. Drill heads of this kind work in a pipe that is set up on the seabed. The drill head is sunk in the pipe, and the pipe follows the drill head into the seabed. Drilling operations of this kind are particularly performed to create the foundations for offshore wind turbines. The energy guiding chain according to the invention is intended to serve to guide the supply lines required for operating the drill head, from a ship or a working platform to the drill head.

According to the practical example illustrated in FIG. 1, energy guiding chain 1 consists of two load strands 3 that absorb the entire load.

Load strands 3 consist of consecutively arranged straps 4, which are made of flexible, seawater-resistant material and permanently connected to the respective adjacent straps via coupling elements 5 to form a load strand 3. Guided through each of load strands 3 is a tension-resistant, seawater-resistant cable 6, extending over the entire length of the energy guiding chain, which essentially bears the entire load of energy guiding chain 1. Seawater-resistant wire cables or cables made of synthetic fibres can be used as cables 6.

The two load strands 3 are connected to each other by a plurality of cross-members 7, arranged at intervals. Cross-members 7 are each fastened to opposite coupling elements 5, which connect straps 4 of a load strand 3 to each other.

Figure 4:
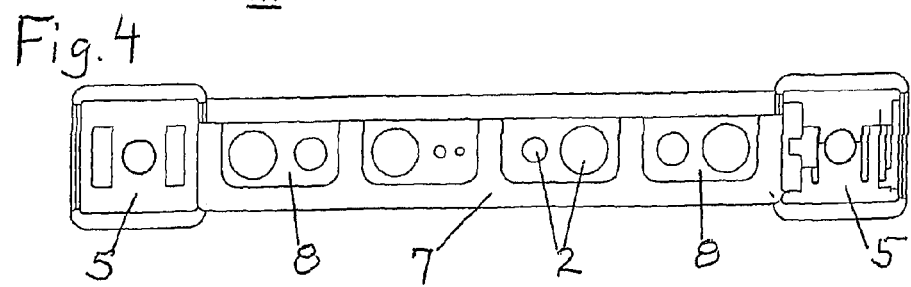

As can particularly be seen from FIG. 4, cross-members 7 display holders 8 for receiving supply lines 2.

All the holders 8 provided on cross-members 7, or at least some of the holders 8, display a strain relief for supply lines 2, such that supply lines 2 are subjected to only little or no tensile stress.

The flexible material of which straps 4 are made is intended to be impact-resistant, compression-proof and shock-absorbing. In addition, the material of straps 4 is intended to display a specific gravity lighter than that of water, such that the entire energy guiding chain 1 is given a certain buoyancy in the water. As a result, it is relative easy, and requires only little force, to lower energy guiding chain 1 down to the respective drill head and haul it in again.

Elastomer material is particularly suitable as the material for the straps, in order to ensure a certain degree of flexibility. In this context, the elastomer material is foamed to manufacture straps 4 and further processed as flexible foam. The foam is manufactured with closed cells, so that straps 4 do not absorb any water. Alternatively, it is also possible to process the foam in at least partially open-cell form, in which case, however, straps 4 then have to be coated with a protective sealing layer.

Straps 4 are of oblong design, specifically displaying a length of approx. 20 to 150 cm, for example. Straps 4 have an essentially rectangular cross-section. To ensure good flexibility of straps 4, they are provided over their length with grooves 9, arranged at intervals, specifically on opposite sides of straps 4, where grooves 9 are arranged parallel to cross-members 7 connecting load strands 3. As a result of this design, straps 4 can be bent to both sides in their principal plane.

Coupling elements 5, connecting straps 4 to each other, are made of a stable, rigid material, particularly since coupling elements 5 do not have to contribute to the flexibility of energy guiding chain 1.

The respective cable 6 is firmly locked in place in coupling elements 5, such that it is ensured that cables 6 bear the entire load of energy guiding chain 1, including supply lines 2.

Cable 6 extends through the entire length of the respective straps 4 and is routed exactly in the neutral axis, not only in coupling elements 5, but also in straps 4. To retain cable 6 in the respective strap 4, straps 4 are each provided with transverse holes 10 between grooves 9, into which retaining pieces 11 and 12 are inserted, as can particularly be seen in FIG. 1. They are connected to each other and fix the respective cable 6 exactly in the neutral axis of load strands 3.

In the practical example illustrated in FIGS. 5 to 8, energy guiding chain 15 consists of three parallel load strands 16. As in the practical example illustrated in FIGS. 1 to 4, load strands 16 are assembled from flexible straps 17 that are connected to each other via rigid coupling elements 18.

Fastened between rigid coupling elements 18 of adjacent load strands 16 are cross-members 19 that serve to accommodate supply lines 2, shown in FIG. 6.

As in the practical example illustrated in FIGS. 1 to 4, cables 20 run through the three load strands 16, extending through the entire length of energy guiding chain 15 and being firmly anchored in coupling elements 18. As a result, the entire load of the energy guiding chain is essentially absorbed by cables 20, while supply lines 2, at least some of which are held in cross-members 19 via strain reliefs, are subjected to only little or no tensile stress.

In this practical example, too, straps 17 are provided with grooves 21 on their opposite sides, running parallel to cross-members 19. This ensures good flexibility of straps 17 to both sides.

In this practical example, too, the three cables 6 are not only fixed in coupling elements 18, but also routed exactly in the neutral axis of load strands 16 within straps 17 by means of retaining pieces 22 and 23.

This feature is particularly important because the energy guiding chain has to display a great length, specifically often up to 200 m and, in special cases, even more.

Since only little space is available on ships or on working platforms floating on the surface of the sea, it must be possible to store energy guiding chains 1 and 15 in space-saving fashion. Different methods are suitable for this purpose. On the one hand, energy guiding chains 1 and 15 can be wound up on a rotating drum on board the ship or on the working platform. On the other hand, suspension devices can be provided on board the ship or on the working platform, on which energy guiding chains 1 and 15 can be hung in the form of a series of loops formed one behind the other. Other storage options are, of course, also conceivable.

| List of reference numbers | |
| --- | --- |
| 1 | Energy guiding chain |
| 2 | Supply lines |
| 3 | Load strands |
| 4 | Straps |
| 5 | Coupling elements |

-continued

| List of reference numbers | |
|---|---|
| 6 | Cables |
| 7 | Cross-members |
| 8 | Holders |
| 9 | Grooves |
| 10 | Transverse holes |
| 11 | Retaining pieces |
| 12 | Retaining pieces |
| 15 | Energy guiding chain |
| 16 | Load strands |
| 17 | Straps |
| 18 | Coupling elements |
| 19 | Cross-members |
| 20 | Cables |
| 21 | Grooves |
| 22 | Retaining pieces |
| 23 | Retaining pieces |

What is claimed is:

1. An energy guiding device for supply lines, comprising:
an energy guiding chain, wherein the energy guiding chain has at least two parallel load strands with consecutively arranged straps,
wherein the straps are made of flexible, water-resistant material and permanently connected to the adjacent straps via coupling elements to form a load strand,
wherein at least one tension-resistant, water-resistant cable, extending over an entire length of the energy guiding chain, is guided through the load strands,
wherein the load strands formed from the straps are connected to each other by cross-members,
wherein the cross-members include holders for receiving the supply lines, and
wherein at least some of the holders provided on the cross-members include a strain relief for the supply lines.

2. The energy guiding device according to claim 1, wherein the flexible material of the straps is impact-resistant, compression-proof and shock-absorbing.

3. The energy guiding device according to claim 1, wherein the flexible material of the straps has a specific gravity lighter than that of water.

4. The energy guiding device according to claim 1, wherein the flexible material of the straps is a closed-cell foam.

5. The energy guiding device according to claim 1, wherein the flexible material of the straps is an at least partially open-cell foam and the straps are coated with an impervious protective layer.

6. The energy guiding device according to claim 1, wherein the straps have an oblong design and include at least one constriction over their length.

7. The energy guiding device according to claim 6, wherein the straps have an essentially rectangular cross-section,
wherein the constrictions comprise grooves located on at least one side of the straps, and
wherein the grooves are arranged parallel to the cross-members connecting the load strands to each other.

8. The energy guiding device according to claim 7, wherein the grooves are provided on opposite sides of the straps.

9. The energy guiding device according to claim 1, wherein the coupling elements connecting the straps are made of a stable, rigid material.

10. The energy guiding device according to claim 9, wherein the cross-members serving to hold the supply lines are located between the rigid coupling elements.

11. The energy guiding device according to claim 1, wherein the cables extending through the load strands are made of a seawater-resistant plastic or a stainless steel wire.

12. The energy guiding device according to claim 1, wherein the cables lie in a neutral axis of the load strands and are fixed at the neutral axis of the load strands.

13. The energy guiding device according to claim 1, wherein the energy guiding chain is configured to be wound up onto a rotating drum.

14. The energy guiding device according to claim 1, wherein the energy guiding chain is configured to be hung on a suspension device in a series of loops formed one behind the other.

15. An energy guiding device for supply lines, comprising:
an energy guiding chain, wherein the energy guiding chain has at least two parallel load strands with consecutively arranged straps,
wherein the straps are made of flexible, water-resistant material and permanently connected to the adjacent straps via coupling elements to form a load strand,
wherein at least one tension-resistant, water-resistant cable, extending over an entire length of the energy guiding chain, is guided through the load strands,
wherein the load strands formed from the straps are connected to each other by cross-members,
wherein the cross-members include holders for receiving the supply lines,
wherein the straps have an oblong design and include at least one constriction over their length,
wherein the straps have an essentially rectangular cross-section,
wherein the constrictions comprise grooves located on at least one side of the straps, and
wherein the grooves are arranged parallel to the cross-members connecting the load strands to each other.

16. The energy guiding device according to claim 15, wherein at least some of the holders provided on the cross-members include a strain relief for the supply lines.

17. The energy guiding device according to claim 15, wherein the flexible material of the straps is impact-resistant, compression-proof and shock-absorbing.

18. The energy guiding device according to claim 15, wherein the flexible material of the straps has a specific gravity lighter than that of water.

19. The energy guiding device according to claim 15, wherein the flexible material of the straps is a closed-cell foam.

20. The energy guiding device according to claim 15, wherein the flexible material of the straps is an at least partially open-cell foam and the straps are coated with an impervious protective layer.

21. The energy guiding device according to claim 15, wherein the grooves are provided on opposite sides of the straps.

22. The energy guiding device according to claim 15, wherein the coupling elements connecting the straps are made of a stable, rigid material.

23. The energy guiding device according to claim 22, wherein the cross-members serving to hold the supply lines are located between the rigid coupling elements.

24. The energy guiding device according to claim 15, wherein the cables extending through the load strands are made of a seawater-resistant plastic or a stainless steel wire.

25. The energy guiding device according to claim 15, wherein the cables lie in a neutral axis of the load strands and are fixed at the neutral axis of the load strands.

26. The energy guiding device according to claim 15, wherein the energy guiding chain is configured to be wound up onto a rotating drum.

27. The energy guiding device according to claim 15, wherein the energy guiding chain is configured to be hung on a suspension device in a series of loops formed one behind the other.

28. An energy guiding device for supply lines, comprising:
- an underwater energy guiding chain configured to be wound up onto a rotating drum and/or configured to be hung on a suspension device in a series of loops formed one behind the other, wherein the underwater energy guiding chain has at least two parallel load strands with consecutively arranged straps,
- wherein the straps are made of flexible, water-resistant material and permanently connected to the adjacent straps via coupling elements to form a load strand,
- wherein at least one tension-resistant, water-resistant cable, extending over an entire length of the energy guiding chain, is guided through the load strands,
- wherein the load strands formed from the straps are connected to each other by cross-members,
- wherein the cross-members include holders for receiving the supply lines.

\* \* \* \* \*